(12) United States Patent
Lee et al.

(10) Patent No.: US 7,525,631 B2
(45) Date of Patent: Apr. 28, 2009

(54) LIQUID CRYSTAL DISPLAY DEVICE AND METHOD OF FABRICATING THE SAME

(75) Inventors: Su Woong Lee, Gyeongsangbuk-do (KR); Mon Soo Kang, Taegu-Kwangyokshi (KR); Hyung Ho Ahn, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 365 days.

(21) Appl. No.: 11/394,231

(22) Filed: Mar. 31, 2006

(65) Prior Publication Data

US 2007/0132936 A1 Jun. 14, 2007

(30) Foreign Application Priority Data

Dec. 13, 2005 (KR) .................. 10-2005-0122672

(51) Int. Cl.
*G02F 1/1339* (2006.01)

(52) U.S. Cl. .................................... 349/156

(58) Field of Classification Search ......... 349/155–157, 349/106, 43, 110
See application file for complete search history.

(56) References Cited

U.S. PATENT DOCUMENTS

| | | | |
|---|---|---|---|
| 2005/0185130 A1* | 8/2005 | Oh et al. ................. | 349/156 |
| 2005/0243262 A1* | 11/2005 | Kim et al. .................. | 349/156 |
| 2005/0270471 A1* | 12/2005 | Kitagawa et al. ............. | 349/156 |
| 2007/0182913 A1* | 8/2007 | Chiu .......................... | 349/156 |

* cited by examiner

*Primary Examiner*—Thoi V Duong
(74) *Attorney, Agent, or Firm*—Holland & Knight LLP (57) ABSTRACT

A liquid crystal display device includes first and second substrates facing each other, first and second column spacers on the second substrate, a protrusion on the first substrate corresponding to the first column spacer, a compensation pattern on the first substrate corresponding to a periphery of the second column spacer, and a liquid crystal layer between the first and second substrates.

22 Claims, 11 Drawing Sheets

LIQUID CRYSTAL DISPLAY DEVICE AND METHOD OF FABRICATING THE SAME

This application claims the benefit of the Korean Patent Application No. P2005-122672, filed on Dec. 13, 2005 and P2006-20597, filed on Mar. 3, 2006, which are hereby incorporated by reference in its entirety.

BACKGROUND OF THE INVENTION

1. Field of the Invention

The present invention relates to a display device, and more particularly, to a liquid crystal display device and method for fabricating the same. Although the present invention is suitable for a wide scope of applications, it is particularly suitable for preventing touch and gravity degradation in the LCD device.

2. Discussion of the Related Art

Much effort has been made to research and develop various kinds of flat panel display devices as the demands for display device rise due to the ongoing development of the information age. The various kinds of flat panel display devices are LCD (liquid crystal display), PDP (plasma display panel), ELD (electroluminescent display), VFD (vacuum fluorescent display) and the like. Some of these flat panel display devices are already in use in various kinds of instruments.

The LCD has the advantageous of light weight, thin profile and low power consumption. Thus, the LCD has been replacing the CRT (cathode ray tube) and is being used as a mobile image display device. For example, the LCD is used as a notebook computer monitor for a mobile usage. Further, the LCD can be used in less mobile applications, such as a TV monitor or a computer monitor. In order for the LCD to be a general image display device for various fields, the LCD not only has to maintain the features of the light weight, thin profile and low power consumption but also needs to be capable of implementing high-grade image having high definition and high luminance on a large-sized display panel.

In general, a liquid crystal display device includes a first substrate, a second substrate bonded to the first substrate with a predetermined gap in-between the first and second substrates, and a liquid crystal layer injected between the first and second substrates. A plurality of spaced apart gate lines crossing a plurality of spaced apart at data lines define pixel areas on the first substrate. A pixel electrode is provided in each of the pixel areas. A thin film transistor is also provide in each of the pixel areas adjacent to where a data line and a gate line of the pixel area cross each other. The thin film transistor of a pixel area provides a data signal from the corresponding data line of the pixel area to the corresponding pixel electrode of the pixel area in response to a signal applied to the corresponding gate line of the pixel area.

A black matrix layer is formed on the second substrate, except for the pixel areas, to block light. Red (R), green (G) and blue (B) color filter layers are formed within areas of the black matrix corresponding to each of the pixel areas to display colors. A common electrode is formed on the color filter layers for forming an electric field with the pixel electrodes to implement an image. More particularly, liquid crystal molecules of the liquid crystal layer between the first and second substrates are aligned by an electric field generated between the pixel electrode and the common electrode. By adjusting a quantity of light transmitted through the liquid crystal layer according to the degree of alignment of the liquid crystal layer, an image can be displayed.

The above-configured liquid crystal display device is called a TN (twisted nematic) mode liquid crystal display device. The TN mode liquid crystal display device has the disadvantage of a narrow viewing angle. To overcome this disadvantage of the TN mode liquid crystal display device, an in-plane switching (IPS) mode liquid crystal display device has been developed. In the IPS mode liquid crystal display device, a pixel electrode and a common electrode are formed parallel to each other in a pixel area of a first substrate with a predetermined distance with each other. A transverse electric field is generated between the pixel and common electrodes to align the molecules of a liquid crystal layer.

In both the TN mode and IPS mode, spacers are formed between the first and second substrates of the above-configured liquid crystal display device to sustain a predetermined gap for accommodating the liquid crystal layer. The spacers can be classified as either ball spacers or column spacers, depending on the shape of the spacers. The ball spacers are spherically shaped and are scattered on the first or second substrate. After the first and second substrates have been bonded to each other, the ball spacers are relatively free to move. And, each of the ball spacers has a relatively small contact area with the first or second substrate.

On the other hand, the column spacers are formed during an array fabrication process of the first or second substrate. Each of the column spacers has a pillar shape having a predetermined height that is affixed to a predetermined substrate. Hence, a contact area of the column spacer with the first or second substrate is relatively greater than the contact area of the ball spacer with the first or second substrate. A related art liquid crystal display device having a column spacer according to a related art is explained with reference to the attached drawings as follows.

Figure 1:
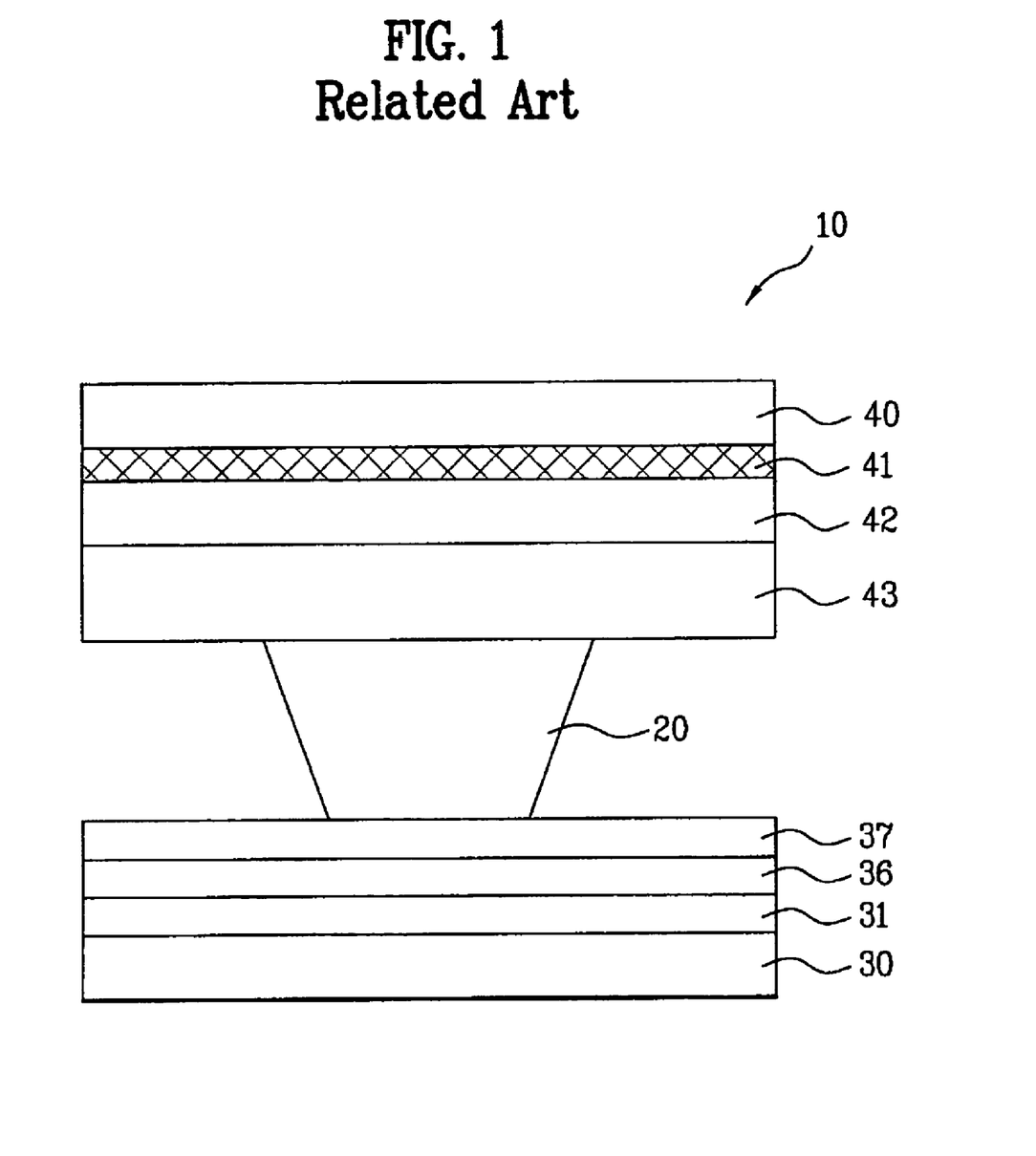
FIG. 1 is a cross-sectional diagram of a related art liquid crystal display device having a column spacer.

FIG. 1 is a cross-sectional diagram of a related art liquid crystal display device having a column spacer. Referring to FIG. 1, a liquid crystal display device having a column spacer includes a first substrate 30, a second substrate 40 facing the first substrate 30, a column spacer 20 provided between the first and second substrates 30 and 40, and a liquid crystal layer (not shown in the drawing) provided between the first and second substrates 30 and 40. A gate line 31 and a data line (not shown in the drawing) are arranged to cross each other on the first substrate 30 to define a pixel area. A thin film transistor (TFT) is formed adjacent to the crossing between the gate line 31 and the data line. A pixel electrode (not shown in the drawing) is formed in the pixel area.

Excluding the pixel area, a black matrix layer 41 is formed on the second substrate 40. A stripe type color filter layer 42 is formed on the black matrix layer corresponding to the pixel area on a vertical line parallel to the data line. A common electrode or an overcoat layer 43 is formed over the second substrate 40. A gate insulating layer 36 is formed over the first substrate 30, including the gate line 31, and a passivation layer 37 is formed on the gate insulating layer 36. The column spacer 20 is formed at a predetermined position over the gate line 31.

Figure 2A:
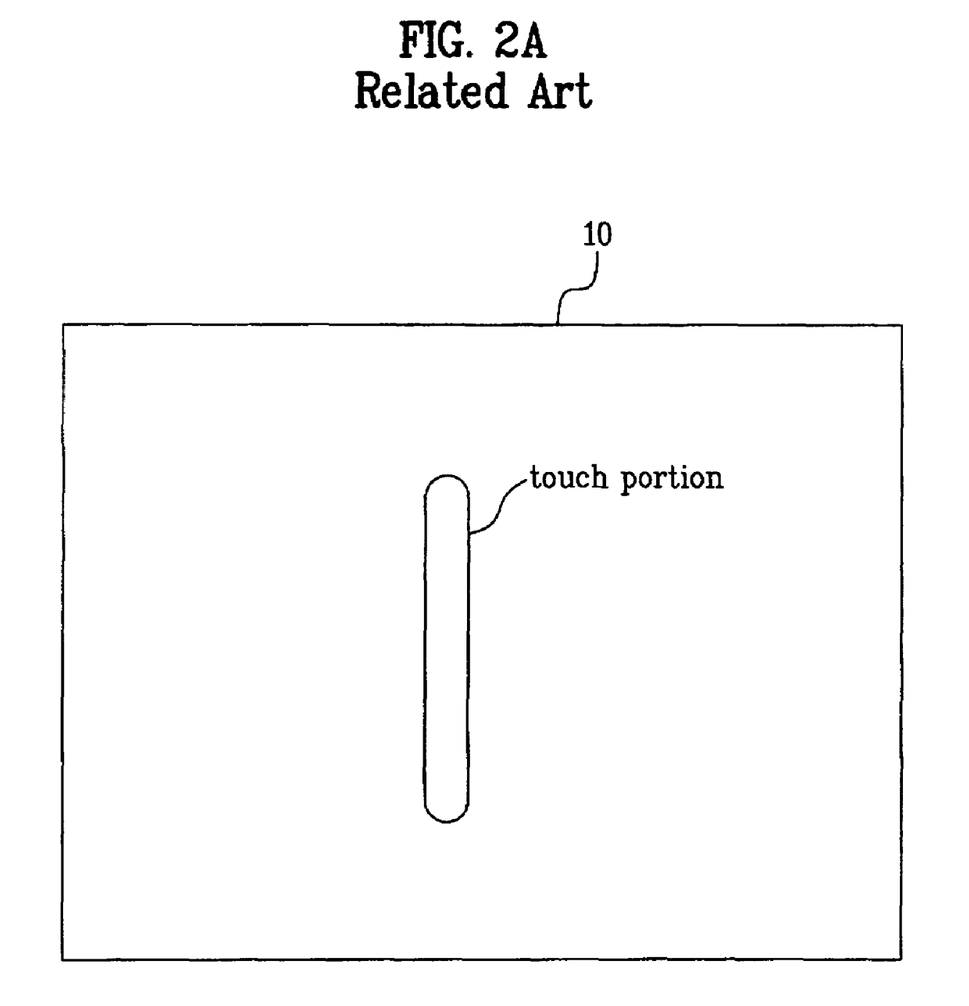
FIG. 2A and FIG. 2B are a plan view and a cross-sectional diagram of a related art liquid crystal display device having a column spacer, respectively.
Figure 2B:
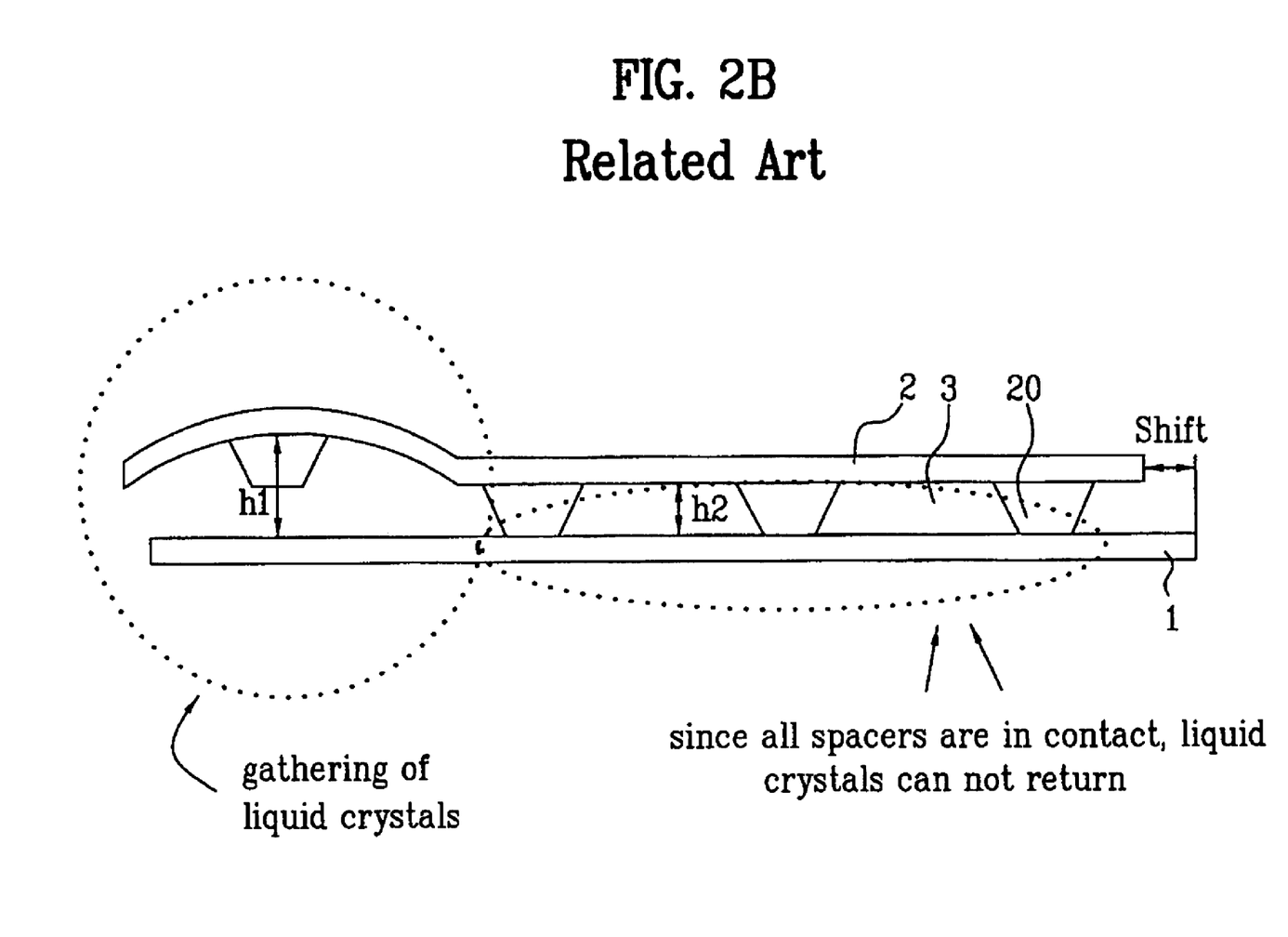

FIG. 2A and FIG. 2B are a plan view and a cross-sectional diagram of a related art liquid crystal display device having a column spacer, respectively. Referring to FIG. 2A and FIG. 2B, a stain is formed on a part of a liquid crystal panel 10 of the above-explained liquid crystal display device having the column spacer if a surface of the part of the liquid crystal panel 10 is touched by a hand or other external object. This stain is called a touch stain, which is generated on the liquid crystal panel 10 while the panel is being touch. If the stain remains on the panel 10 after being touched, it is called a touch degradation.

A touch stain is caused by a shift between the first and second substrates 1 and 2 due to a touch. The touch degradation is attributed to a large contact area of the column spacer 20 having considerable friction between the column spacer 20 and the first substrate 1, as compared to the friction that would be generated between the ball spacer structure and the first substrate in which the ball spacer structure has less contact area with the first substrate 1. Because of the friction between the column spacer 20 having a column shape and the first substrate 1, as shown in FIG. 2B, it takes a considerably long time for the stained panel to return to an original state after a shift between the first and second substrates 1 and 2 is caused by a touch. Hence, the stain remains until the shift between the first and second substrates 1 and 2 recovers back or is undone.

The related art liquid crystal display device with the column spacer has the following problems. First, the contact area between the column spacer and the confronting substrate is relatively large such that the static friction is large and if the LCD panel has substrate shifting due to a touch, it takes a considerably long time for a panel to recover. Hence, the touch degradation is observed during the recovery of the panel. Second, if the LCD panel having the column spacer is held upright and is placed in an environment at a high temperature, the liquid crystals go through thermal expansion such that a cell gap is extended more than the height of the column spacer, which enables liquid crystal molecules to flow downward and make a lower end of the LCD panel bulge, which causes an opaqueness in the LCD panel.

SUMMARY OF THE INVENTION

Accordingly, the present invention is directed to a liquid crystal display device method for fabricating the same that substantially obviates one or more problems due to limitations and disadvantages of the related art.

An object of the present invention is to provide a liquid crystal display device configured to prevent touch degradation.

Another object of the present invention is to provide a liquid crystal display device configured to prevent gravity degradation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes first and second substrates facing each other, first and second column spacers on the second substrate, a protrusion on the first substrate corresponding to the first column spacer, a compensation pattern on the first substrate corresponding to a periphery of the second column spacer, and a liquid crystal layer between the first and second substrates.

In another aspect, a liquid crystal display device includes first and second substrates facing each other, first and second column spacers on the second substrate, a protrusion on the first substrate corresponding to the first column spacer, a compensation pattern on the first substrate at a periphery of the second column spacer, and a liquid crystal layer between the first and second substrates.

In another aspect, a method for fabricating a liquid crystal display device that includes first and second substrate includes: forming first and second column spacers on the second substrate; forming a protrusion on the first substrate corresponding to the first column spacer; forming a compensation pattern on the first substrate corresponding to a periphery of the second column spacer; and providing a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 3:
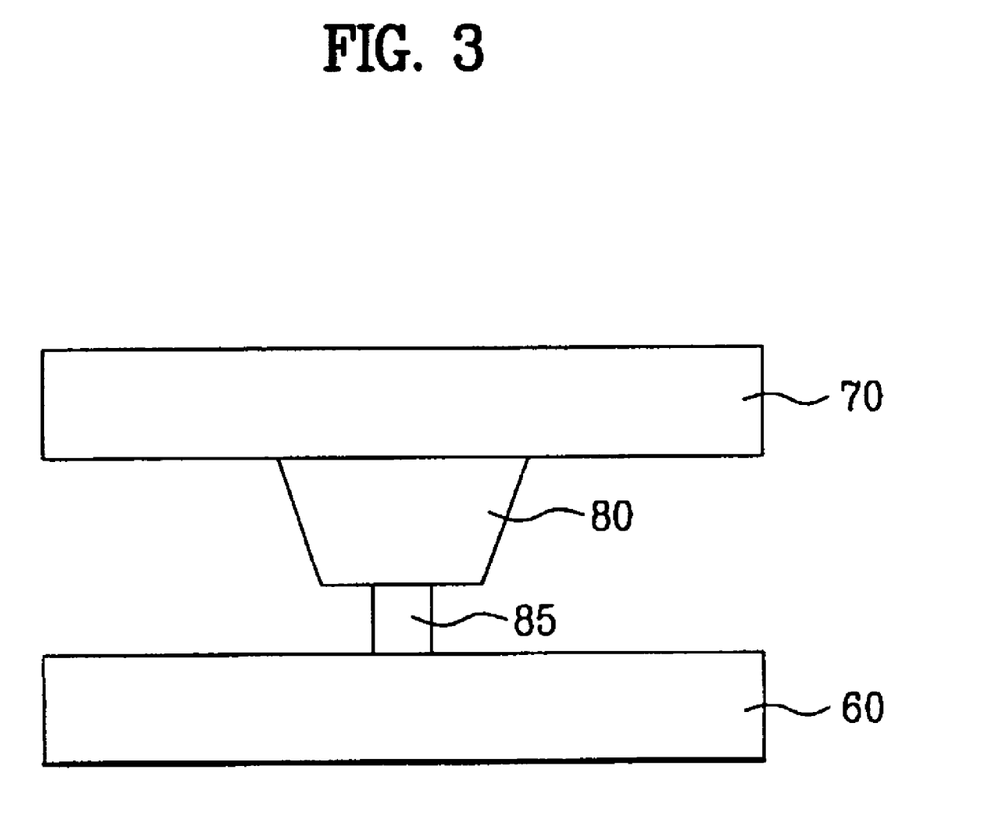
FIG. 3 is a cross-sectional diagram of a liquid crystal display device having a protrusion.

FIG. 3 is a cross-sectional diagram of a liquid crystal display device having a protrusion. Referring to FIG. 3, a liquid crystal display device having a protrusion includes a first substrate 60 and a second substrate 70 facing each other, a protrusion 85 formed on the first substrate 60, a column spacer 80 formed on the second substrate 70 to oppose the protrusion 85, and a liquid crystal layer (not shown in the drawing) formed between the first and second substrates 60 and 70. The protrusion 85 is configured to correspond with the column spacer 80 and to has a smaller dimensional size than that of the column spacer 80.

When the protrusion 85 is positioned corresponding to an opposing column spacer 80 having a smaller dimensional size, a contact area between the column spacer 80 and the protrusion 85 is reduced, which decreases frictional area.

Because friction between the column spacer 80 and the protrusion 85 is reduced, when the first and second substrates 60 and 70 are shifted with respect to each other due to a touch, the first and second substrates 60 and 70 can readily return to their original position. Hence, touch degradation can be prevented.

In this type of liquid crystal display device having a protrusion 85, a change in the shape of the column spacer 80 corresponding to the protrusion 85 occurs when the first and second substrates 60 and 70 are bonded together. More particularly, a force is applied to the column spacer 80 opposing the protrusion 85 during bonding of the first and second substrates 60 and 70 such that the column spacer 80 is depressed to a predetermined thickness. If a liquid crystal display panel is placed in an environment having a high temperature, the liquid crystal may expand such that the column spacer 80 is no longer depressed and becomes spaced apart from the first substrate 80. Thus, a gravity degradation, manifesting as bulge in a lower end of the liquid crystal display panel, can occur due to the liquid crystal molecules flowing downward via a gap between the column spacer and the protrusion 85 as a result of the thermal expansion of the liquid crystal molecules being greater than that of the column spacer in the high-temperature environment. To prevent such a gap, the column spacer 80 can be depressed down to a smaller thickness during bonding of first and second substrates 60 and 70. The amount of depression on the column spacer 80 is called a gravity margin.

If a pressure is externally applied to the liquid crystal display device including the protrusion structure such that a force applied to the column spacer 80 by the protrusion 85 is too strong, a stain can be generated in the display panel because the column spacer 80 will fail to return to its original shape despite removal of the external pressure. In order to prevent such a stain, a column spacer having a press-preventing function is further included so that the liquid crystal panel can withstand large external pressures. Thus, a first column spacer is formed to correspond with the protrusion and a second column spacer is formed to be spaced apart from and to oppose the facing substrate. This configuration of spacers is called a dual column spacer structure.

Figure 4A:
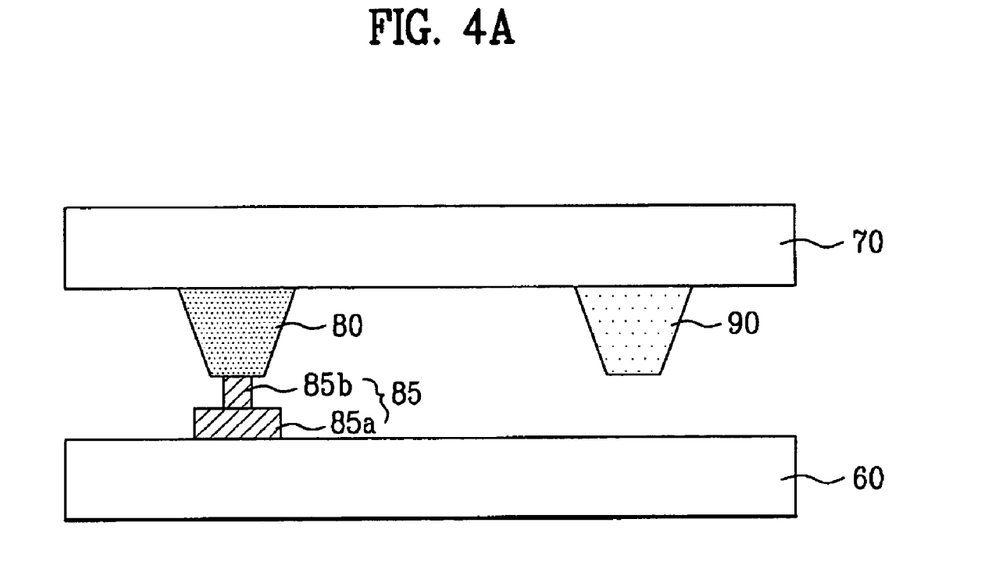
FIG. 4A and FIG. 4B are cross-sectional diagrams of a liquid crystal display device having a dual column spacer structure for explaining normal alignment and misalignment between a protrusion and a column spacer.

FIG. 4A and FIG. 4B are cross-sectional diagrams of a liquid crystal display device having a dual column spacer structure for explaining a normal alignment and a misalignment between a protrusion and a column spacer. Referring to FIG. 4A, a dual column spacer structure includes a first substrate 60 and a second substrate 70 facing each other, a protrusion 85 formed at a predetermined portion of the first substrate 60, a first column spacer 80 on the second substrate 70 opposing the protrusion 85 on the first substrate 60, a second column spacer 90 on the second substrate 70 spaced apart from the first substrate 60 at a predetermined distance, and a liquid crystal layer (not shown in the drawing) formed between the first and second substrates 60 and 70. As shown in FIG. 4A, the protrusion 85 can include a semiconductor layer pattern 85a and a source/drain metal layer 85b stacked on the semiconductor layer pattern 85a. Typically, an area of the source/drain metal layer 85b is relatively smaller than the area of the semiconductor layer pattern 85a.

The first column spacer 80 is formed to have the same thickness as the second column spacer 90. The second column spacer 90 does not correspond with any protrusions. Thus, the second column spacer 90 can be spaced apart from the first substrate 60 as far as a distance corresponding to the thickness of the protrusion 85.

The above-explained structure, as shown in FIG. 4A, is for a state of a protrusion in which the first and second substrates 60 and 70 are completely aligned and bonded. The following will explain the state of protrusion in which misalignment takes place during bonding between the first and second substrates 60 and 70, or a shift occurs between the first and second substrates 60 and 70 due to a touch and remains as a touch degradation.

Figure 4B:
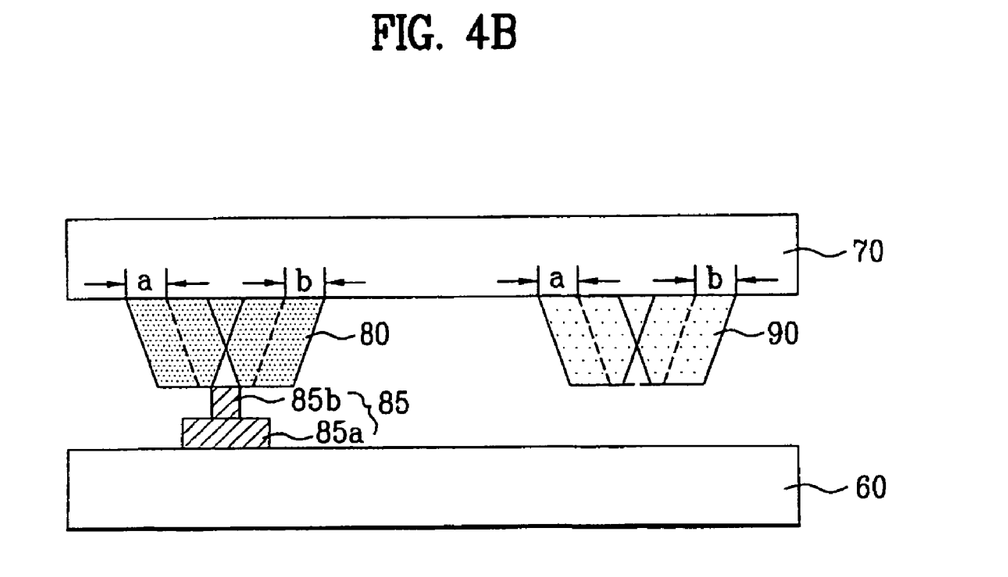

Referring to FIG. 4B, if a shift takes place between the first and second substrates 60 and 70, an extent of a first column spacer 80 shift with respect to the protrusion 85 varies according to the extent of a shift between substrates. More particularly, if the second substrate 70 is shifted to the left by more than a distance 'a' with respect to the first substrate 60, the protrusion 85 is relocated off to the left side of the first column spacer 80. In this case, the protrusion 85 no longer contacts the first column spacer 80, and thus cell gap is difficult to maintain. Therefore, the cell gap is likely to decrease when the first and second column spacers 80 and 90 are able to come into contact with the first substrate 60. Moreover, when the first and second column spacers 80 and 90 are contacting the first substrate 60, the liquid crystal panel will be unable to recover from touch degradation because the first column spacer 80 will have slipped off the protrusion 85. Hence, the cell gap will be decreased and repositioning of the first column spacer 80 back onto the protrusion 85 may be difficult. Likewise, if the second substrate 70 is shifted to the right by more that a distance 'b' with respect to the first substrate 60, the protrusion 85 is relocated off to the right side of the first column spacer 80. Thus, the same problem can occur to the right side of the protrusion 85.

The following explains a liquid crystal display device according to an embodiment of the present invention, in which relocation of a column spacer with respect to a protrusion is limited despite a shift between the first substrate and the second substrate.

Figure 5A:
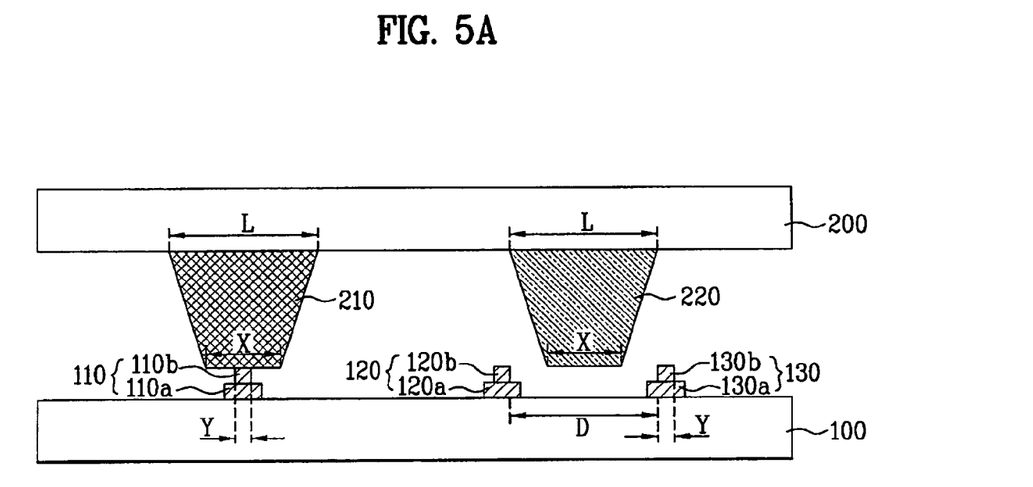
FIG. 5A and FIG. 5D are cross-sectional diagrams of a liquid crystal display device according to an embodiment of the present invention to explain a normal alignment and misalignments between a protrusion, compensation patterns and a first or second column spacer.
Figure 5B:
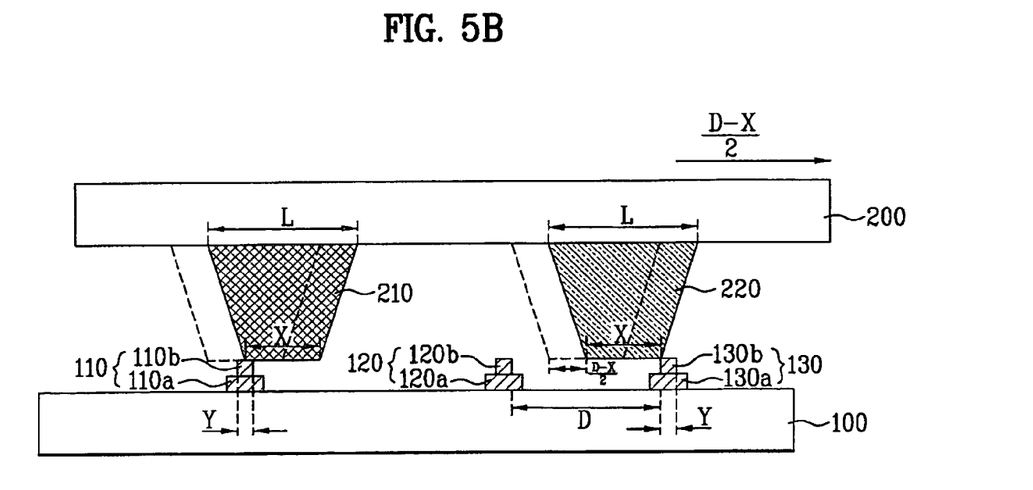
Figure 5C:
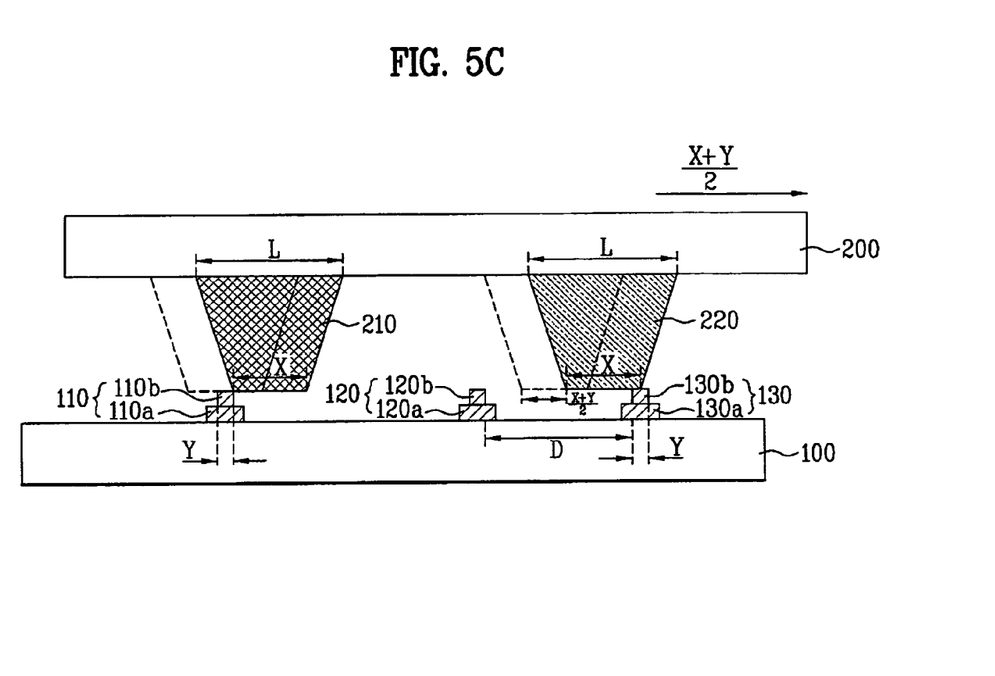
Figure 5D:
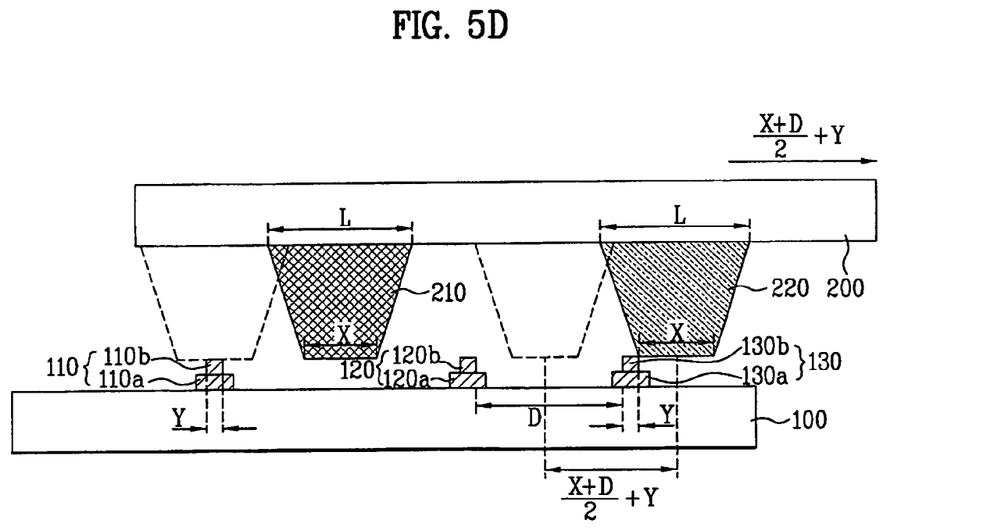

FIG. 5A and FIG. 5D are cross-sectional diagrams of a liquid crystal display device according to an embodiment of the present invention to explain a normal alignment and misalignments between a protrusion, compensation patterns and a first or second column spacer, respectively. Referring to FIG. 5A, a liquid crystal display device according to the present invention includes a first substrate 100 and a second substrate 200 facing each other, a protrusion formed on a predetermined portion of the first substrate 100, a first column spacer 210 formed on the second substrate 200 opposing the protrusion 110 on the first substrate 100, a second column spacer on the second substrate 200 space apart from the first substrate 100 at a predetermined distance, first and second compensation patterns 120 and 130 formed around a periphery of the second column spacer 220, and a liquid crystal layer (not shown in the drawing) formed between the first and second substrates 100 and 200.

The protrusion 110 can include a semiconductor layer pattern 110a and a source/drain metal layer 110b stacked on the semiconductor layer pattern 110a. An area of the source/drain metal layer 110b is formed have a smaller area than that of the semiconductor layer pattern 110a. The first column spacer 210 is formed to have the same thickness as the second column spacer 220. The second column spacer 220 does not to correspond to a column spacer. Thus, the second column spacer 220 is spaced apart from the first substrate 110 as far as a distance corresponding to the thickness of the protrusion 110.

Like the protrusion 110, each of the first and second compensation patterns 120 and 130 include a semiconductor layer pattern 120a or 130a and a source/drain metal layer 120b or 130b stacked on the semiconductor layer pattern 120a or 130a. Hence, a thickness of the protrusion 110 is equal to that of the first and second compensation patterns 120 and 130.

The structure shown in FIG. 5A corresponds to a state where a bonding between the first and second substrates 100 and 200 is normally completed. After bonding the first and second substrates 100 and 200 together, a predetermined area of the first column spacer 210 among the column spacers is only brought into contact with an upper area of the protrusion 110. The second column spacer 220 is spaced apart from the first substrate 100.

Between the first and second compensation patterns 120 and 130, there is a distance D between the source/drain metal layers 120a and 130a on the upper layers of the compensation patterns 120b and 130b. Further, there is a distance Y across the upper surface of the protrusion 110.

The first and second column spacers 210 and 220 are formed to have the same height and about the same size, so that the contact area between the protrusion and the first column spacer during normal alignment is equal or similar to the contact area between the compensation patterns and the second column spacer during a misalignment. There is also a distance X across a first surface of the second column spacer 220 opposite to the first substrate 100 between a first side surface and a second side surface of the second column spacer 220. Further, there is also a distance L of a second surface of the second column spacer 220 adjacent to the second substrate 200 between a first side surface and a second side surface of the second column spacer 220. The distance D between the first and second compensation patterns 120 and 130 is equal to or greater than X because the second column spacer 220 does not make contact with the compensation patterns 120 and 130 during normal alignment. The distance X of the upper surface of the second column spacer 220 corresponds to about a half of the distance L of the lower surface of the second column spacer 220. More specifically X can be equal to about 0.95*L/2.

In the above-configured structure, in case that a shift between the first and second substrates 100 and 200 is brought about by a touch, the second column spacer 220 can come into contact with one of the first and second compensation patterns 120 and 130. In this case, an upper area of the first or second compensation pattern 120 or 130 is as good as an upper area of the protrusion 110. Since a contact ratio considerably smaller than an overall column spacer area can be provided in touch, a difference of a contact area ratio between the column spacers and the facing substrate is not considerable. Hence, the recovery to an original state is easier.

FIG. 5A shows a liquid crystal display device according to an embodiment of the present invention having the first and second substrates 100 and 200 normally aligned and bonded together. FIG. 5B to FIG. 5D show cases of misalignment between the first and second substrates 100 and 200 after bonding. In particular, the FIG. 5B to FIG. 5D different misalignment states of the second substrate 200 shifted to right with respect to the first substrate 100.

If the shift extent of the second substrate 200 with respect to the first substrate 100 is between 0 and $(D-X)/2$ as shown in FIG. 5B, the first column spacer 210 is in contact with and corresponds only to the protrusion 110. However, the second column spacer 220 is brought into contact with the second compensation pattern 130 when the second substrate 200 is shifted to right with respect to the first substrate 100 by a distance greater than $(D-X)/2$. In particular, as the extent of the shift increases, the second column spacer 220 (initially centered between compensation patterns) moves to one side across a distance greater than $(D-X)/2$, the second compensation pattern 130 and the second column spacer 220 contact each other. Thus, the second compensation pattern 130 play a role as a protrusion for the second column spacer 220 if there is a sufficient extent of shift. The point at which the second column spacer 220 comes into contact with the compensation pattern depends on the length of the distance X of the upper surface of the second column spacer 220 and the length of the distance D between compensation patterns located along a line in the shift direction.

Referring to FIG. 5C, as the second substrate 200 is shifted to right with respect to the first substrate 100 by an extent more than $(X+Y)/2$, the first column spacer 210 is no longer in contact with the protrusion 110. The point at which the first column spacer separates from the protrusion 110 depends on the distance X across the upper surface of the second column spacer 220 and the distance Y across the upper surface of the protrusion 110. If a shift between the first and second substrates 100 and 200 takes place, which is more than $(X+Y)/2$ so as to cause a separation between the first column spacer 210 and the protrusion 110, the second compensation pattern will come into contact with the second column spacer to play a role as a protrusion. Accordingly, a shift extent of $(D-X)/2$ at which the second compensation pattern 130 coming into contact with the second column spacer 220 should be somewhat smaller than a shift extent of $(X+Y)/2$ at which the protrusion 110 is separating from the first column spacer 210. Thus, the relation of $(D-X)/2<(X+Y)/2$ suggests that a relation of a distance D between compensation pattern should be $D<(2X+Y)$.

If L is equal to or greater than about 2X, and if Y is smaller than X, the distance D between the first and second compensation patterns 120 and 130 is equal to or smaller than the distance L of the lower surface of the second column spacer 220. Thus, the distance D between the first and second compensation patterns can be a distance equal to or greater than X, and should be equal to or smaller than L. Hence, the distances of X, D and L can have the relationship of $X \leq D \leq L$ if $L \geq 2X$. Based on this relationship, if the extent of a shift between the first and second substrates 100 and 200 is between $(D-X)/2$ and $(X+Y)/2$, the first column spacer 210 contacts the first protrusion 110 and the second column spacer 220 contacts the second compensation pattern 130. In other words, if the shift extent is within the shift range of $(D-X)/2 \leq$ shift extent $\leq (X+Y)/2$), both of the first and second column spacers 210 and 220 are brought into contact with structures (protrusion and compensation pattern) having small upper surfaces formed on the first substrate 100, respectively.

The extent of shift at which the point of contact occurs between the second column spacer 220 and the second compensation pattern 130 depends on the distance D between the first and second compensation patterns 120 and 130. For instance, if the distance D between the first and second compensation patterns 120 and 130, as shown in FIGS. 5A-5D is 2X, the extent of shift before the second column spacer 220 comes into contact with the second compensation pattern 130 is X/2. Thus, the extent of shift extent range where the the first and second column spacers 210 and 220 are respectively brought into contact with the protrusion 110 and the second compensation pattern 130 is between $(D-X)/2$ $(=X/2)$ and $(X+Y)/2$.

In another example, if the distance D between the first and second compensation patterns 120 and 130 is 3X/2, the shift extent at the timing point of the second column spacer 220 brought into contact with the second compensation pattern 130 is X/4. For when the distance D is 3X/2, the extent of shift extent range where the the first and second column spacers 210 and 220 are respectively brought into contact with the protrusion 110 and the second compensation pattern 130 is between $(D-X)/2$ $(=X/4)$ and $(X+Y)/2$.

In yet another example, if the distance D between the first and second compensation patterns 120 and 130 is about equal to X, the second column spacer 220 is brought into contact with the second compensation pattern 130 right after misalignment (if a misalignment extent exceed zero). For when the distance D is about equal to X, the first and second column spacers 210 and 220 keep respectively contacting the protrusion 110 and the second compensation pattern 130 during even a slight misalignment. In other words, if the distance D between the first and second compensation patterns 120 and 130 is X, the first and second column spacers 210 and 220 respectively contact with the protrusion 110 and the second compensation pattern 130, except for the case of normal alignment. Further, the second column spacer 220 contacts the second compensation pattern 130 only when the extent of the shift is between (X+Y)/2 and (D+X)/2+Y. As the distance D between the first and second compensation patterns 120 and 130 becomes smaller, the range within which the second column spacer 220 to come into contact with the compensation pattern 120 decreases.

Moreover, after the first column spacer 210, as shown in FIG. 5D, is shifted away from the protrusion 110, the second column spacer 220 keeps in contact with the second compensation pattern 220 until the shift between the first and second substrates 100 and 200 is greater than (X+D)/2+Y. So, the second compensation pattern 130 plays a role as a protrusion for the second column spacer 220. Thus, if the extent of the shift between the first and second substrates 100 and 200 is within a range between (X+Y)/2 and (D+X)/2+Y, [(X+Y)/2<shift extent<(D+X)/2+Y], the second column spacer 220 contacts the second compensation pattern 130.

A shift between the first and second substrates 100 and 200, as shown in FIGS. 5B to 5D, may take place in a right, left, upper or lower direction. For example, when a shift of the second substrate 200 with respect to the first substrate 100 takes place in the left direction, the first compensation pattern 120 performs the aforesaid function of the second compensation pattern 130. As can be seen in FIGS. 5A to 5D, if the shift between the first and second substrates 100 and 200 takes place due to misalignment, the extent of shift range available is less than (X+D)/2+Y.

In the liquid crystal display device according to embodiments of the present invention, if a misalignment resultant from bonding is below (X+D)/2+Y, at least one of the compensation patterns 120 and 130 is in contact with the second column spacer 220 if the protrusion 110 is not in contact with the first column spacer 210. As mentioned in the foregoing description, even if misalignment takes place in the liquid crystal display device according to embodiments of the present invention, the first column spacer 210 takes on a press-preventing function and the second column spacer 220 contacts one of the first of second compensation pattern 120 and 130 in a cell gap maintaining function. Compared to the previously discussed normal alignment scenario, the functions of the first and second column spacers 210 and 220 are switched. Thus, recovery to the original state is facilitated since a contact area between the column spacers and the protrusions is small during the states of either normal alignment, misaligned bonding or touch. Hence, touch degradation can be prevented. Further, gravity degradation can be prevented since a protrusion is always in contact with a column spacer. Moreover, if a pressure is applied, the separately provided column spacer corresponding to a surface of the facing substrate provides a press-preventing function.

If the first and second compensation patterns 120 and 130 are arranged in the above manner according to embodiments of the invention, the bonding margin will be smaller than the distance (X+D)/2+Y, where X is the distance across the upper surface of the column spacer 210 and Y is the distance across the upper surface of the protrusion 110. At least one of the compensation patterns will correspond with the second column spacer 220 while in misalignment or the first column spacer 210 will correspond to the protrusion 210 while in alignment. Hence, the same effect of sustaining a small contact area can be brought about despite misalignment. Even if the contact between the second column spacer 220 and the first or second compensation pattern 120 or 130 is made together with the contact between the first column spacer 210 and the protrusion 110 due to a low extent of misalignment, the contact area of both column spacers is still smaller than that of either the first and second column spacers 210 and 220 directly contacting the first substrate 100 since the upper surface of the protrusion 110 and/or one of the compensation patterns 120 or 130 will still have a small area.

FIGS. 6A to 6D are layouts of a liquid crystal display device according to an embodiment of the present invention, which describe modified embodiments of showing a second column spacer and a variety of compensation patterns. FIGS. 6A to 6D show upper surfaces of the second column spacer 220 and the compensation patterns. The first column spacer 210, the second column spacer 220, the protrusion 110, the first compensation pattern 120 and the second compensation pattern 130 are formed in a non-display area, such as over a gate line 101 on a thin film transistor array substrate, as shown in FIGS. 6A to 6D, or over a black matrix layer on a color filter substrate.

Figure 6A:
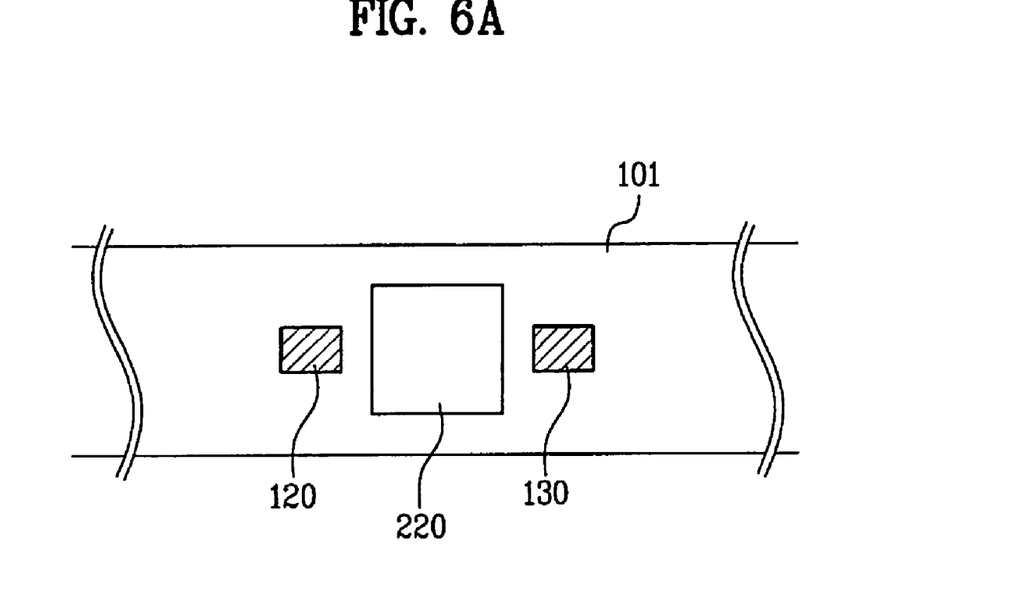
FIGS. 6A to 6D are layouts of a liquid crystal display device according to an embodiment of the present invention, which describe modified embodiments of showing a second column spacer and a variety of compensation patterns.

FIG. 6A shows first and second compensation patterns 120 and 130 formed at left and right sides of the second column spacer 220, respectively, over the gate line 101. The first and second compensation patterns 120 and 130 formed at left and right sides of the second column spacer 220, as shown in FIG. 6A, prevent misalignment in a direction extending between the right and left sides.

Figure 6B:
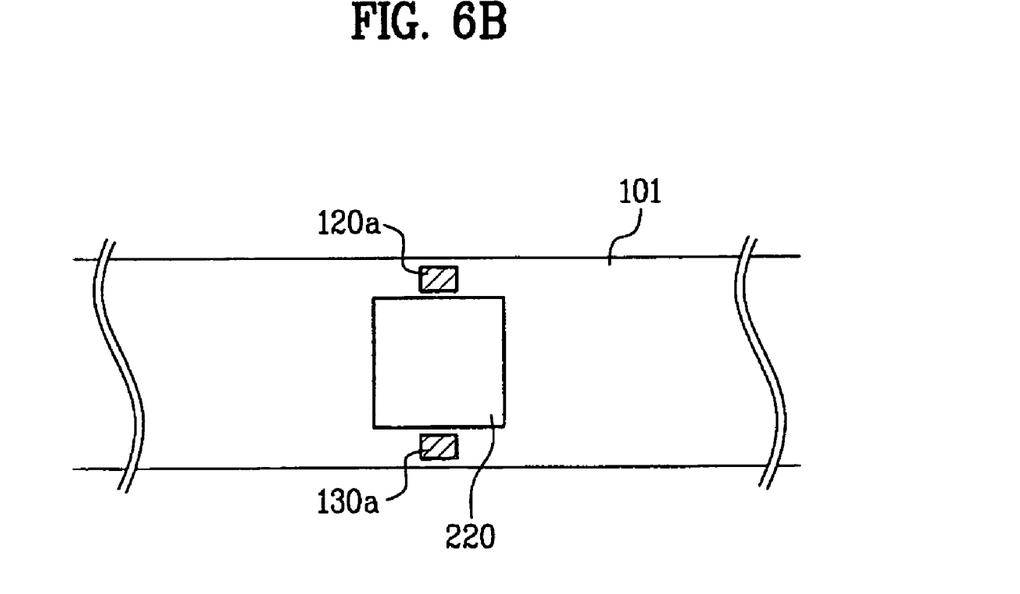

FIG. 6B shows first and second compensation patterns 120a and 130a formed at upper and lower sides of the second column spacer 220, respectively, over the gate line 101. The first and second compensation patterns 120a and 130a formed at upper and lower sides of the second column spacer 220, as shown in FIG. 6B, prevent misalignment in a direction extending between the upper or lower sides.

Figure 6C:
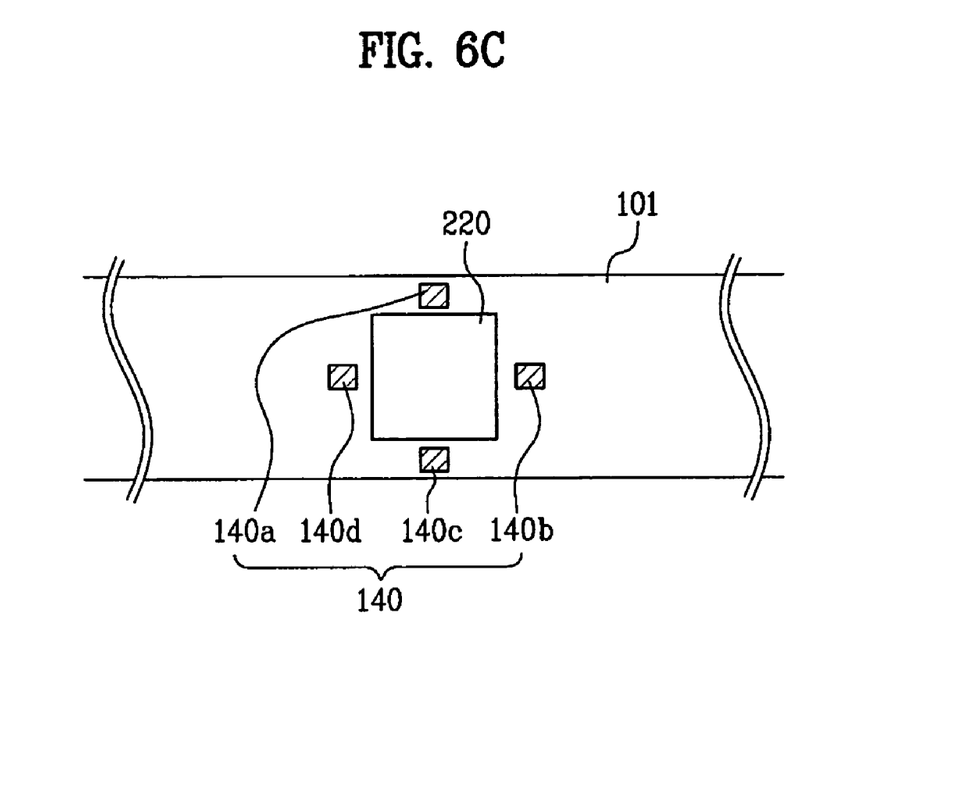

FIG. 6C shows first to fourth compensation patterns 140a to 140d formed next to upper, lower, left and right sides of the second column spacer 220, respectively, over the gate line 101. Each of the second and fourth compensation patterns 140b and 140d formed next to the left and right sides of the second column spacer 220, respectively, are at the same distance from the second column spacer 220 and each of the first and third compensation patterns 140a and 140c formed one upper and lower sides of the second column spacer 220, respectively are also at the same distance from the second column spacer 220. The bonding margin from right-to-left and upper-to-lower can be the same or different.

Figure 6D:
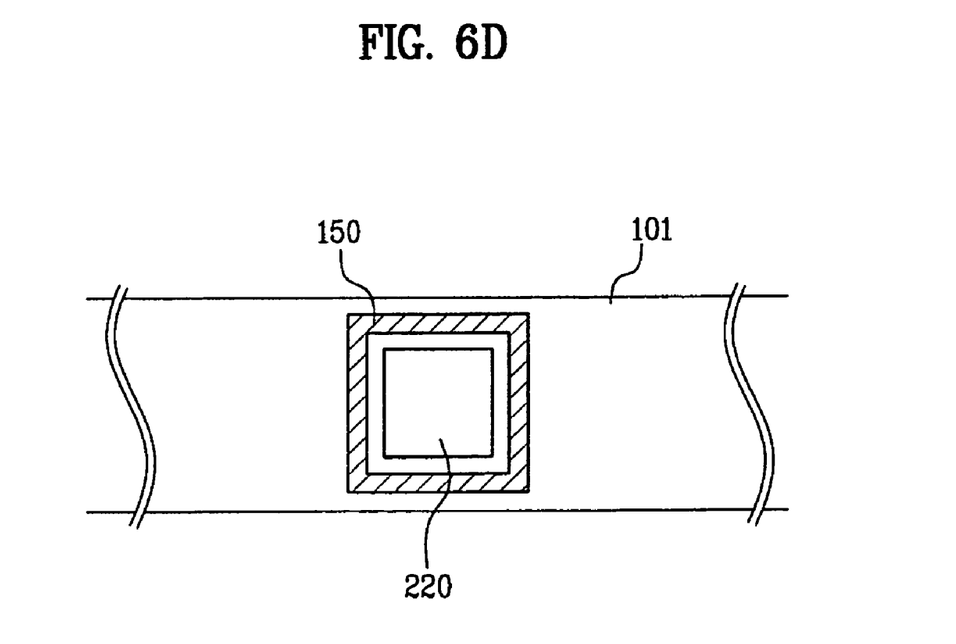

FIG. 6D shows a closed-ring type compensation pattern 150 formed around the second column spacer 220 over the gate line 101. The second column spacer 220 has a predetermined distance from the compensation pattern 150 in all directions. Alternatively, the upper surface of second column spacer 220 can overlap the closed-ring type compensation pattern 150.

In the above-explained embodiments of the present invention, the second column spacer 220 is designed to correspond with a predetermined portion over the gate line 101 of the second substrate 200 and the compensation pattern is formed to be spaced apart from the edges of the upper surface of the second column spacer 220 with a predetermined interval. The type of bonding margin between the first and second substrates 100 and 200 determine the shape of the compensation pattern 130 and the separated extent of the second column spacer 220 with respect to the upper surface of the second column spacer 220 with a predetermined interval. The more the bonding margin increases, the more the separated extent increases, and vice versa. The arrangement interval is determined so that a predetermined portion of the compensation pattern corresponds with the second column spacer 220 when that the protrusion 110 deviates off of the first column spacer 210.

Figure 7:
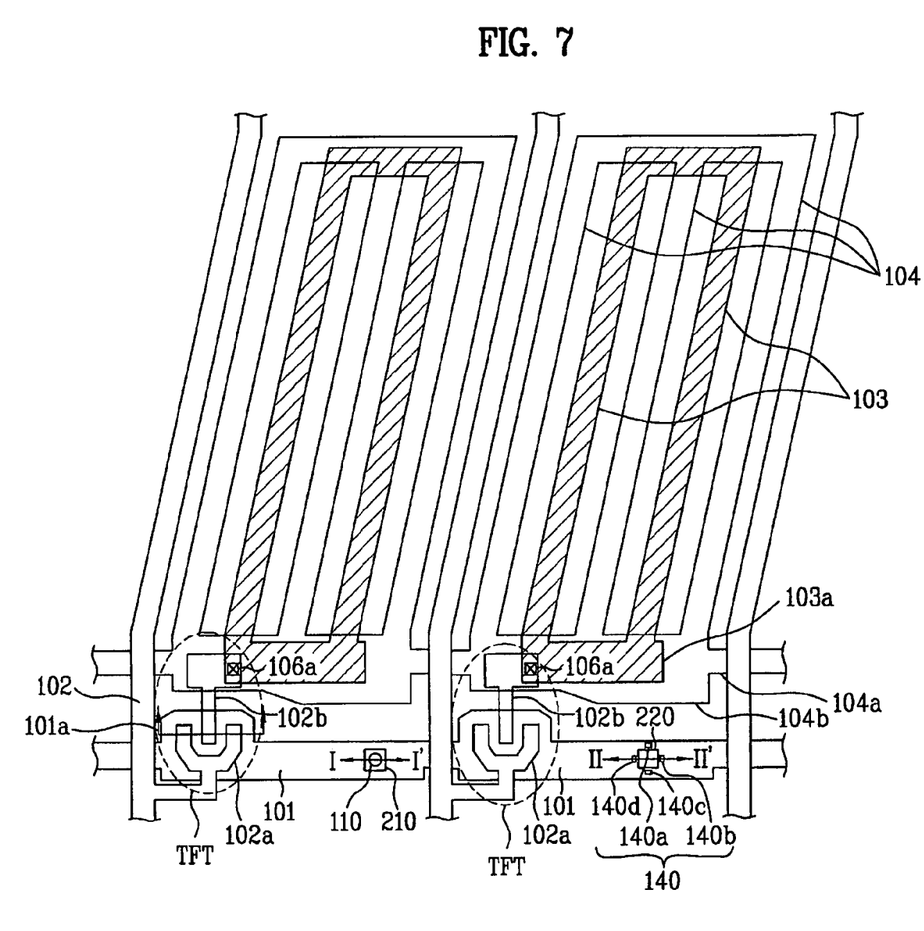
FIG. 7 is a plan view of a liquid crystal display device according to an embodiment of the present invention.
Figure 8:
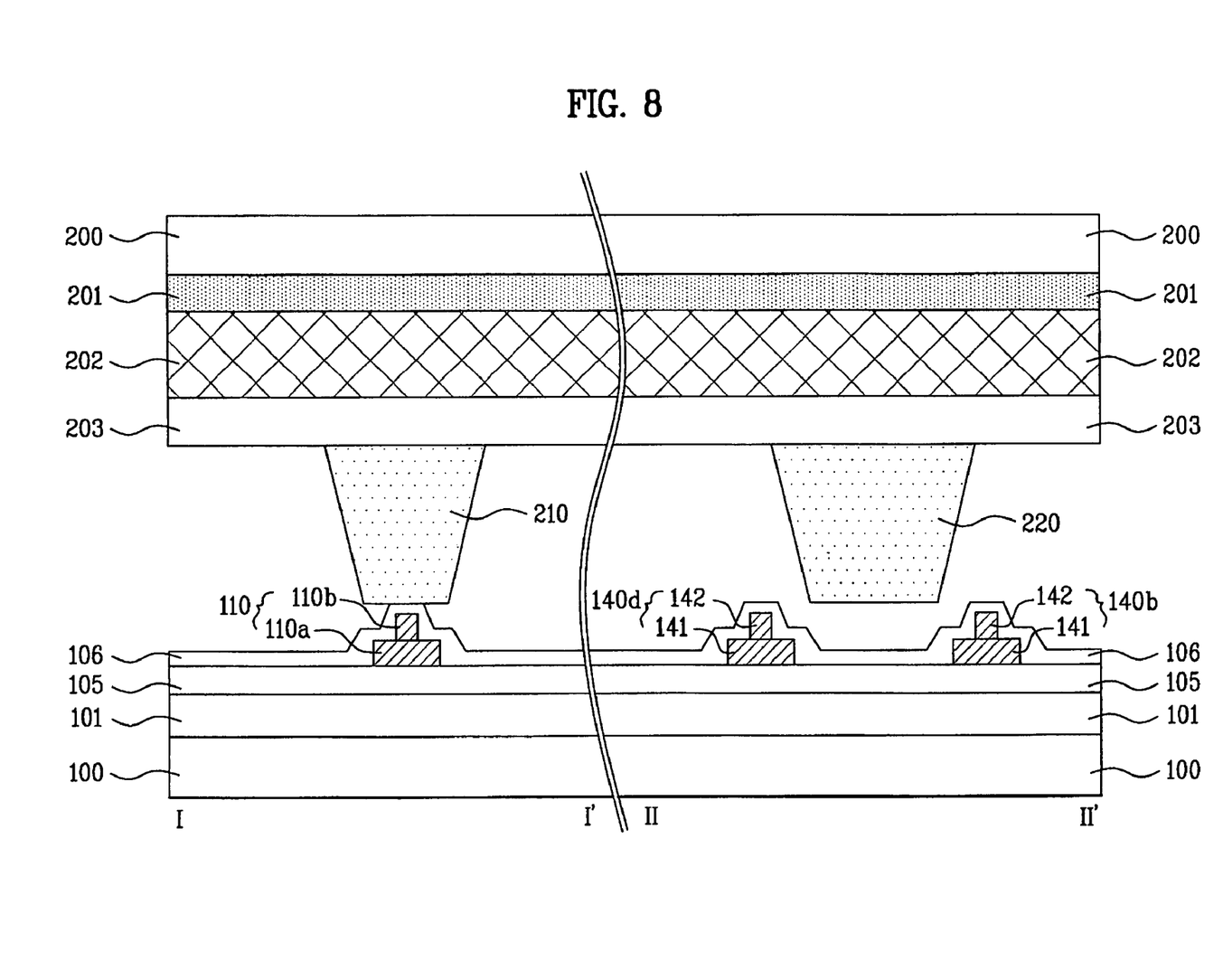
FIG. 8 is a cross-sectional diagram along lines I-I' and II-II' of FIG. 7.

FIG. 7 is a plan view of a liquid crystal display device according to an embodiment of the present invention and FIG. 8 is a cross-sectional diagram along lines I-I' and II-II' of FIG. 7. Referring to FIG. 7 and FIG. 8, a liquid crystal display device according to embodiments of the present invention includes a first substrate 100, a second substrate 200 confronting the first substrate 100 and a liquid crystal layer (not shown in the drawing) formed between the first and second substrates 100 and 200. A gate line 101 is formed on the first substrate 100 crossing a data line 102 to define a pixel area. A thin film transistor TFT is formed at the crossing of the gate and data lines 101 and 102. A first storage electrode 103a is electrically connected to a drain electrode 102b of the thin film transistor TFT. Further, a pixel electrode 103 diverges from the first storage electrode 103a on the first substrate 100. In addition, a common electrode 104 alternates with the pixel electrode 103 and a common line 104a in the vicinity of the gate line 101 within the pixel area to runs parallel to the gate line 101 on the first substrate 100. Furthermore, a second storage electrode 104b connected to the common line 104a and the common electrode 104 overlaps the first storage electrode 103a.

A channel of the thin film transistor TFT is defined between a U-shaped source electrode 102a and the drain electrode 102b. The channel is a U-shape along an inside of the U-shaped source electrode 102a. The thin film transistor TFT includes a gate electrode 101a protruding from the gate line 101, the U-shaped source electrode 102a protrudes from the data line 102, and the drain electrode 102b is spaced apart from the U-shaped source electrode 102a. A semiconductor layer (not shown in the drawing) is further provided under the data line 102, the source electrode 102a, the drain electrode 102b and the channel region between the source and drain electrodes 102a and 102b. The semiconductor layer includes an amorphous silicon layer (not shown in the drawing) and an n+ layer stacked on the amorphous silicon layer. The n+ layer is removed from the channel region between the source and drain electrodes 102a and 102b. Thus, the semiconductor layer can be selectively formed under the source and drain electrodes 102a and 102b. In the drawing, the source electrode 102a has a U-shape and the liquid crystal display device has the U-shaped type channel. Alternatively, the source electrode 102a can just protrude from the data line 102 as a line or be formed in various other types of shapes.

The gate line 102, the common line 104a and the common electrode 104 are formed of the same metal on the same gate insulating layer 105. More particularly, the gate insulating layer 105 is formed between the gate line 101 and the semiconductor layer. A protecting layer 106 is formed between the data line 102 and the pixel electrode 103. The second storage electrode 104b connected to the common line 104a traversing the pixel area, the first storage electrode 103a over the second storage electrode 104b, and the protecting layer 106 formed between the two storage electrodes 104b and 103a configure a storage capacitor. The drain electrode 102b and the first storage electrode 103a, which are formed on different layers, respectively, are connected to each other via a contact hole 106a formed by removing a portion of the protecting layer 106 over the drain electrode 102b.

A protrusion 110 includes a first semiconductor layer pattern 110a of the same layer as the semiconductor layer 107a and a first source/drain metal layer 110b of the same layer as the source/drain electrode 102a/102b stacked on the first semiconductor layer pattern 110a is formed on a predetermined portion over the gate line 101, the common line 104a or the second storage electrode 104b. The compensation patterns 140a to 140d, including a second semiconductor layer pattern 141 of the same layer as the semiconductor layer 107a and a second source/drain metal layer 142 of the same layer as the source/drain electrode 102a/102b stacked on the second semiconductor layer pattern 141, are formed next to upper, lower, left and right sides of the second column spacer 220. In this case, the protrusion 110 and the compensation pattern 140 are formed of the same material with the same thickness.

A black matrix layer 201 corresponding to an area (gate and data line parts) excluding the pixel area, a color filter layer 202 and an overcoat layer 203 for planarization are formed on the second substrate 200 confronting the first substrate 100.

The first column spacer 210 is designed to be correspondingly contacted with the protrusion 110 having a relatively small opposing contact area and the second column spacer 220 is designed to remain within the compensation pattern 140. A horizontal cross-section of the column spacer 210 can have one of a variety of shapes, such as a circle, a square, a polygon and the like. The horizontal cross-section of the column spacer 210 corresponds to a circle or an equilateral polygon to maximize process alignment margins.

Each of the first and second semiconductor layer patterns 110a and 141 is formed to be 0.2~0.3 μm thick and each of the first and second source/drain metal layers 110b and 142 is formed to be 0.2~0.4 μm thick. Compared to a portion over the gate line 101 not having the protrusion 110 or the compensation pattern 140, a over the gate line 100 with the protrusion 110 and the compensation pattern 140 formed thereon has a step difference of 0.4~0.7 μm.

The compensation pattern 140, as shown in the drawings, include the first to fourth compensation patterns 140 spaced from one another and next to upper, right, lower and left sides of the second column spacer 220. The compensation pattern 140 can be formed in one of a variety of different patterns around the second column spacer 220. Accordingly, embodiments of the present invention can be modified into various forms unlike the embodiments shown in FIGS. 6A to 6D.

In the above-configured liquid crystal display device according to the present invention, the first and second substrates 100 and 200 confront each other. The protrusion 110 corresponds with a center of the first column spacer 210 and the compensation pattern 140 is provided around the second column spacer 220. Thus, the first column spacer 210 plays a role in sustaining a cell gap between the first and second substrates 100 and 200. The second column spacer 220 spaced apart from the first substrate 100 partially plays a role in sustaining the cell gap together with the first column spacer 210 in case that the display device is depressed by an external pressure. Hence, the plastic transformation of the column spacer is prevented so as to prevent press degradation (stain). Moreover, when liquid crystals expand at high temperature to the extent that the first column spacer 210 is no longer depressed by the protrusion 110, the first and second substrates 100 and 200 can be contacted with each other instead of being spaced apart from each other. Hence, gravity degradation can be prevented.

If the protrusion 110 deviates off of the first column spacer 210 due to a misalignment occurrence between the first and second substrates 100 and 200 before a bonding process, the second column spacer 220 can correspond with the compensation pattern 140 or a predetermined portion of the compensation pattern. Hence, the second column spacer 200 can play a role in sustaining the cell gap and the first column spacer 210 has the press-preventing function. By adopting the above-explained configuration, the touch, gravity and press degradations can be simultaneously prevented even if the bonding process is carried out with a misalignment between the first and second substrates 100 and 200.

The above-explained embodiments of the present invention concern the in-plane switching (IPS) mode LCD and is also applicable to the twist nematic (TN) mode LCD. The aforesaid description is similarly applicable to the TN mode LCD except that a pixel electrode is formed as one pattern in a pixel area of a first substrate and that a common electrode is formed over a second substrate. In a TN mode LCD, since the common line is not formed within the pixel area second column spacers and the protrusion are formed on the gate line.

Embodiments of the present invention have a protrusion having a small contact area is correspondingly centered with a first column spacer and a compensation pattern(s) is formed around a second column spacer. When the first and second substrates normally confront each other, the protrusion corresponds with the center of the first column spacer and the compensation pattern is centered around the second column spacer. Thus, the first column spacer plays a role in sustaining the cell gap between the first and second substrates and the second column spacer spaced apart from the first substrate partially plays a role in sustaining the cell gap together with the first column spacer in case that first or second substrate is pressed by an external pressure. Hence, the plastic transformation of the column spacers is prevented so as to prevent press degradation (stain). Moreover, when the liquid crystal molecules expand at high temperature to more of an extent that the first column spacer is initially depressed by the protrusion, the first and second substrates can still be contacted with each other instead of being spaced apart from each other. Hence, gravity degradation can be prevented.

If the protrusion deviates off of the first column spacer due to a misalignment occurrence between the first and second substrates in a bonding process, the second column spacer can correspond with the compensation pattern or a predetermined portion of the compensation pattern. Hence, the second column spacer can play a role in sustaining the cell gap and a function of the first column spacer is switched to have the press-preventing function. Hence, the first column spacer has the press-preventing function and the second column spacer has the touch and gravity degradation preventing functions together with the cell gap sustaining function. By adopting the above-explained configuration, the touch, gravity and press degradations can be simultaneously prevented even if the bonding process is carried out that causes a misalignment between the first and second substrates.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   first and second substrates facing each other;
   first and second column spacers on the second substrate;
   a protrusion on the first substrate corresponding to the first column spacer;
   a compensation pattern on the first substrate corresponding to a periphery of the second column spacer, wherein the compensation pattern includes a plurality of compensation patterns equally spaced apart from a first surface of second column spacer, the first surface of the second column spacer is opposite to the first substrate,
   wherein a first distance between the plurality of compensation patterns is more than a second distance across the first surface of the second column spacer opposite to the first substrate between a first side surface and a second side surface of the second column spacer, and the second distance is less than a third distance of a second surface of the second column spacer adjacent to the second substrate between a first side surface and a second side surface of the second column spacer, wherein a bonding margin between the first and second substrates is smaller than to {(the first distance+the second distance)/2+ the distance of upper surface of the compensation pattern}; and
   a liquid crystal layer between the first and second substrates.

2. The liquid crystal display device of claim 1, wherein the compensation pattern is spaced apart from a first surface of the second column spacer, the first surface of the second column spacer is opposite to the first substrate.

3. The liquid crystal display device of claim 1, wherein the protrusion is on the first column spacer and the second column spacer is opposite to the first substrate.

4. The liquid crystal display device of claim 1, wherein the protrusion is on the first column spacer and the compensation pattern is on the second column spacer.

5. The liquid crystal display device of claim 1, wherein the protrusion is opposite to the second substrate and the compensation pattern is on the second column spacer.

6. The liquid crystal display device of claim 1, wherein the first substrate includes:
   gate and data lines crossing each other to define a pixel area;
   a thin film transistor adjacent to a crossing of the gate and data lines; and
   a pixel electrode in the pixel area.

7. The liquid crystal display device of claim 6, wherein the pixel area includes common electrodes alternating with the pixel electrodes.

8. The liquid crystal display device of claim 6, wherein the second substrate includes:
   a black matrix layer corresponding to an area excluding the pixel area; and
   a color filter layer corresponding to an area including the pixel area at least.

9. The liquid crystal display device of claim 8, further comprising an overcoat layer on the second substrate.

10. The liquid crystal display device of claim 8, further comprising a common electrode on the second substrate.

11. The liquid crystal display device of claim 6, wherein the thin film transistor includes:
    a gate electrode protruding from the gate line;
    source and drain electrodes spaced apart from each other and positioned over the gate electrode; and
    a semiconductor layer between the gate electrode and the source/drain electrodes and contacted by the source and drain electrodes.

12. The liquid crystal display device of claim 1, wherein the protrusion and the compensation pattern are of the same material and of the same thickness.

13. The liquid crystal display device of claim 12, wherein each of the protrusion and the compensation pattern includes a semiconductor layer pattern formed of the same layer as the semiconductor layer and a source/drain electrode layer formed of the same layer as the source/drain electrodes on the semiconductor layer pattern.

14. The liquid crystal display device of claim 1, wherein the compensation pattern has a closed-ring shape spaced apart from the second column spacer, the first surface of the second column spacer is opposite to the first substrate.

15. The liquid crystal display device of claim 1, wherein a plurality of the compensation patterns are arranged on left and right sides of the second column spacer.

16. The liquid crystal display device of claim 1, wherein a plurality of the compensation patterns are arranged on upper and lower sides of the second column spacer.

17. The liquid crystal display device of claim 1, wherein a plurality of the compensation patterns are arranged on left, right, upper and lower sides of the second column spacer.

18. The liquid crystal display device of claim 1, wherein when the first and second substrates are misaligned with each other, the first column spacer and the protrusion are non-overlapping and the second column spacer overlaps a portion of the compensation pattern.

19. A method for fabricating a liquid crystal display device that includes first and second substrate comprising:
  forming first and second column spacers on the second substrate;
  forming a protrusion on the first substrate corresponding to the first column spacer;
  forming a compensation pattern on the first substrate corresponding to a periphery of the second column spacer, wherein the compensation pattern includes a plurality of compensation patterns equally spaced apart from a first surface of second column spacer, the first surface of the second column spacer is opposite to the first substrate,
  wherein a first distance between the plurality of compensation patterns is more than a second distance across the first surface of the second column spacer opposite to the first substrate between a first side surface and a second side surface of the second column spacer, and the second distance is less than a third distance of a second surface of the second column spacer adjacent to the second substrate between a first side surface and a second side surface of the second column spacer, wherein a bonding margin between the first and second substrates is smaller than to {(the first distance+the second distance)/2 the distance of upper surface of the compensation pattern}; and
  providing a liquid crystal layer between the first and second substrates.

20. The method for fabricating a liquid crystal display device according to claim 19, further comprising:
  forming gate and data lines crossing each other to define a pixel area on the first substrate;
  forming a thin film transistor adjacent to a crossing of the gate and data lines; and
  forming a pixel electrode in the pixel area.

21. The method for fabricating a liquid crystal display device according to claim 20, wherein the forming the thin film transistor includes:
  forming a gate electrode protruding from the gate line;
  forming source and drain electrodes spaced apart from each other and positioned over the gate electrode; and
  forming a semiconductor layer between the gate electrode and the source/drain electrodes and contacted by the source and drain electrodes.

22. The method for fabricating a liquid crystal display device according to claim 21, wherein each of the protrusion and the compensation pattern includes a semiconductor layer pattern formed of the same layer as the semiconductor layer and a source/drain electrode layer formed of the same layer as the source/drain electrodes on the semiconductor layer pattern.

* * * * *